United States Patent
Chung et al.

(10) Patent No.: US 10,236,688 B2
(45) Date of Patent: Mar. 19, 2019

(54) METHOD FOR REGULATING AN ELECTRICAL POWER CIRCUIT AND AN ELECTRICAL POWER REGULATING APPARATUS

(71) Applicant: City University of Hong Kong, Kowloon (HK)

(72) Inventors: Shu Hung Henry Chung, Mid-levels (HK); Hiu Kwan Tse, Tin Shui Wai (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 61 days.

(21) Appl. No.: 15/275,772

(22) Filed: Sep. 26, 2016

(65) Prior Publication Data

US 2018/0090938 A1   Mar. 29, 2018

(51) Int. Cl.
*H02J 3/38* (2006.01)
*H02J 7/00* (2006.01)
*H02J 3/18* (2006.01)
*H02J 3/32* (2006.01)
*H02N 2/18* (2006.01)

(52) U.S. Cl.
CPC ............ *H02J 3/383* (2013.01); *H02J 3/1814* (2013.01); *H02J 3/32* (2013.01); *H02J 3/387* (2013.01); *H02J 7/0068* (2013.01); *H02N 2/18* (2013.01); *H02N 2/181* (2013.01)

(58) Field of Classification Search
CPC . G06F 17/50; G05F 1/70; H02K 7/02; H02M 5/458; H02M 1/14; H02M 5/45; H02J 4/00; H02J 3/1814; H02J 3/32; H02J 3/383; H02J 3/387; H02J 7/0068; H02N 2/18; H02N 2/181
See application file for complete search history.

(56) References Cited

U.S. PATENT DOCUMENTS

| 4,494,180 A * | 1/1985 | Streater | H02M 3/10 318/801 |
|---|---|---|---|
| 6,894,461 B1 * | 5/2005 | Hack | G05F 1/70 307/82 |
| 2013/0159956 A1 * | 6/2013 | Verghese | G06F 17/5036 716/122 |
| 2013/0328397 A1 * | 12/2013 | Lee | H02J 3/32 307/23 |
| 2016/0268916 A1 * | 9/2016 | Ramsay | H02M 5/458 |

* cited by examiner

*Primary Examiner* — Robert Deberadinis
(74) *Attorney, Agent, or Firm* — Renner Kenner Greive Bobak Taylor & Weber (57) ABSTRACT

An electrical power regulating apparatus includes a controller arranged to detect an electrical source characteristic of an electrical power source; and a power converter arranged to adjust an electrical load characteristic of an electrical loading stage in connection with the electrical power source based on the at least one electrical source characteristic being detected by the controller, such that the electrical power source is arranged to deliver a maximum amount of electrical power to the electrical loading stage. A method for regulating an electrical power circuit is also provided.

20 Claims, 11 Drawing Sheets

METHOD FOR REGULATING AN ELECTRICAL POWER CIRCUIT AND AN ELECTRICAL POWER REGULATING APPARATUS

TECHNICAL FIELD

The present invention relates to a method for regulating an electrical power circuit and an electrical power regulating apparatus, although not exclusively, to an electrical power regulator for extracting maximum amount of power from an electrical power source.

BACKGROUND

Electronic or electrical devices usually operate with suitable energy sources connected thereto. Common energy sources may include electrical sockets in a power grid, energy harvesting devices, fuel cells and batteries.

Energy harvesting devices such as photovoltaic cell or piezoelectric energy harvester may be used conveniently in daily life to convert energy of certain types into electrical energy for powering up electrical devices. Energy harvesting devices may be designed to operate with one or more optimal conditions such that the energy harvesting efficiency may be maximized during operations.

SUMMARY OF THE INVENTION

In accordance with a first aspect of the present invention, there is provided a method for regulating an electrical power circuit, comprising the steps of detecting an electrical source characteristic of an electrical power source; and adjusting an electrical load characteristic of an electrical loading stage in connection with the electrical power source based on the at least one electrical source characteristic being detected, such that the electrical power source is arranged to deliver a maximum amount of electrical power to the electrical loading stage.

In an embodiment of the first aspect, the electrical power source is arranged to deliver a maximum amount of power to the electrical loading stage when the electrical load characteristic matches with the electrical source characteristic.

In an embodiment of the first aspect, the step of adjusting an electrical load characteristic of an electrical loading stage includes the step of counteracting an effect caused by a source reactance of the electrical power source and/or a reactance of the electrical power circuit in response to a variation in the amount of the electrical power delivered to the electrical loading stage by the electrical power source.

In an embodiment of the first aspect, the electrical loading stage comprises a bidirectional power converter and an electrical load.

In an embodiment of the first aspect, the bidirectional power converter is connected between the electrical load and the electrical power source.

In an embodiment of the first aspect, the step of counteracting the effect caused by the source reactance of the electrical power source and/or the reactance of the electrical power circuit includes delivering a portion of electrical power from the electrical power source to an intermediate voltage source of the bidirectional power converter and/or to delivering a supplementary electrical power from the intermediate voltage source to the electrical load.

In an embodiment of the first aspect, the intermediate voltage source includes a rechargeable battery.

In an embodiment of the first aspect, the step of adjusting an electrical load characteristic of an electrical loading stage further includes controlling a switching network of the bidirectional power converter so as to adjust the electrical power delivered to the intermediate voltage source and/or the supplementary electrical power delivered from the intermediate voltage source.

In an embodiment of the first aspect, the electrical source characteristic and the electrical load characteristic includes at least one of a resistive, an inductive and a capacitive properties of the electrical power source and the electrical loading stage respectively.

In an embodiment of the first aspect, the step of detecting an electrical source characteristic of the electrical power source comprises the step of using a perturb-and-observe method to determine the resistive, the inductive and the capacitive properties of the electrical power source.

In an embodiment of the first aspect, the step of using a perturb-and-observe method to determine the resistive, the inductive and the capacitive properties of the electrical power source comprises the step of representing the electrical power circuit as a representation of $$I_T(s) = \frac{s}{s^2(L_{T,eq} - L_x) + s(R_{T,eq} + R_x) + \left(\frac{1}{C_{T,eq}} - \frac{1}{C_x}\right)} V_T(s).$$

In an embodiment of the first aspect, the step of detecting an electrical source characteristic of the electrical power source includes obtaining a/the voltage value and a current value at an output terminal of the electrical power source so as to determine the resistive, the inductive and the capacitive properties of the electrical power source.

In an embodiment of the first aspect, the electrical power source includes an electrical energy harvesting device.

In accordance with a second aspect of the present invention, there is provided an electrical power regulating apparatus comprising a controller arranged detect an electrical source characteristic of an electrical power source; and a power converter arranged to adjust an electrical load characteristic of an electrical loading stage in connection with the electrical power source based on the at least one electrical source characteristic being detected by the controller, such that the electrical power source is arranged to deliver a maximum amount of electrical power to the electrical loading stage.

In an embodiment of the second aspect, the electrical power source is arranged to deliver a maximum amount of power to the electrical loading stage when the electrical load characteristic matches with the electrical source characteristic.

In an embodiment of the second aspect, the electrical loading stage comprises the power converter and an electrical load, wherein the power converter includes a bidirectional power converter.

In an embodiment of the second aspect, the bidirectional power converter is connected between the electrical load and the electrical power source.

In an embodiment of the second aspect, the controller is further arranged to control the bidirectional power converter, so as to counteract an effect caused by a source reactance of the electrical power source and/or a reactance of the electrical power circuit in response to a variation in the amount of the electrical power delivered to the electrical loading stage by the electrical power source.

In an embodiment of the second aspect, the bidirectional power converter comprises an intermediate voltage source arranged to receive a portion of electrical power from the electrical power source and/or to deliver a supplementary electrical power to the electrical load, so as to counteract the effect caused by the source reactance of the electrical power source and/or the reactance of the electrical power circuit.

In an embodiment of the second aspect, the intermediate voltage source includes a rechargeable battery.

In an embodiment of the second aspect, the controller is further arranged to control a switching network of the bidirectional power converter so as to counteract the effect caused by the source reactance of the electrical power source and/or the reactance of the electrical power circuit.

In an embodiment of the second aspect, the electrical source characteristic and the electrical load characteristic includes at least one of a resistive, an inductive and a capacitive properties of the electrical power source and the electrical loading stage respectively.

In an embodiment of the second aspect, the controller is further arranged to determine the resistive, the inductive and the capacitive properties of the electrical power source using a perturb-and-observe method.

In an embodiment of the second aspect, the controller is further arranged to obtain a voltage value and a current value at an output terminal of the electrical power source so as to determine the resistive, the inductive and the capacitive properties of the electrical power source.

In an embodiment of the second aspect, the electrical power source includes an electrical energy harvesting device.

In accordance with a third aspect of the present invention, there is provided an electrical circuit comprising an electrical power regulating apparatus in accordance with the second aspect and an electrical power source arranged to operate in a maximum power transfer condition.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENT

The inventors have, through their own research, trials and experiments, devised that any linear electrical network can be modeled by a Thevenin's equivalent circuit or Norton's equivalent circuit.

Figure 1A:
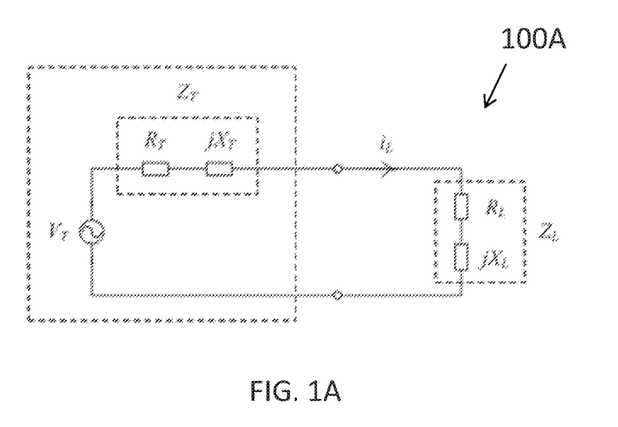
FIGS. 1A and 1B are schematic diagrams of a Thevenin's equivalent circuit and a Norton's equivalent circuit respectively representing an example electrical circuit.

With reference to FIG. 1A, there is shown a Thevenin's equivalent circuit consists of an ideal voltage source $V_T$ and a series-connected output impedance $Z_T$. An ideal voltage source can maintain a prescribed voltage across its terminals irrespective of the magnitude of the current flowing through it. $Z_T$ consists of the resistance (real part) $R_T$ and reactance (imaginary part) $X_T$. Mathematically, $Z_T$ can be expressed as $$Z_T = R_T + jX_T \tag{1}$$

If $X_T > 0$, $Z_T$ is inductive. Conversely, if $X_T < 0$, $Z_T$ is capacitive.

Figure 1B:
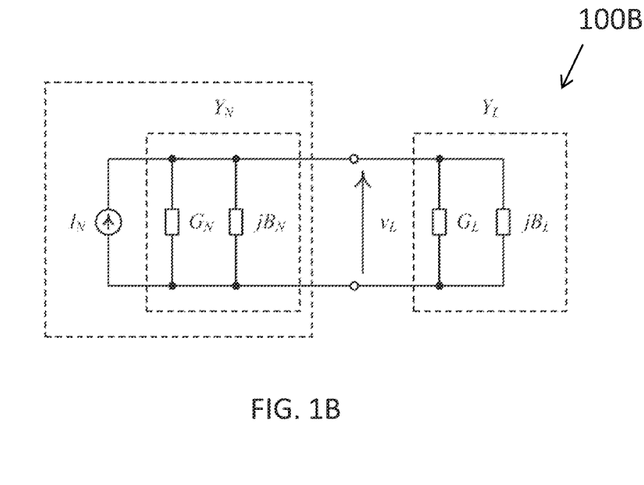

With reference to FIG. 1B, there is shown a Norton's equivalent circuit consists an ideal current source $I_N$ and a parallel-connected output admittance $Y_N$. An ideal current source can maintain a prescribed current through its terminals irrespective of the magnitude of the voltage across it. $Y_N$ consists of the conductance (real part) $G_N$ and susceptance (imaginary part) $B_N$. Mathematically, $Y_N$ can be expressed as $$Y_N = G_N + jB_N \tag{2}$$

If $B_N > 0$, $Y_N$ is capacitive. Conversely, if $B_N < 0$, $Y_N$ is inductive.

The Thevenin's equivalent circuit and the Norton's equivalent circuit shown can be mutually converted. Their parameters are converted according to the following relations:

$$I_N = \frac{V_T}{Z_T} \tag{3}$$

and $$Y_N = \frac{1}{Z_T} \tag{4}$$

In general, maximum power transfer from the voltage or current source to the load occurs under specific load type and value. The load impedance $Z_L$ and admittance $Y_L$ have to be the complex conjugates of $Z_T$ and $Y_N$, respectively. Such maximum power transfer phenomenon facilitates maximum power extraction from the energy resources. For example, energy resources such as electromagnetic energy harvester may be modeled by the circuit shown in FIG. 1A. The ideal voltage source $V_T$ represents the voltage induced in the coils moving across the magnetic field, while $R_T$ represents the coil resistance and $X_T$ represents the coil reactance.

In another example, energy resources such as piezoelectric energy harvester may be modeled by the circuit shown in FIG. 1B. The ideal current source $I_N$ represents the charge produced by the piezoelectric materials under mechanical stress, while $G_N$ represents the conductance of the piezoelectric material and $B_N$ represents the susceptance of the capacitance between the terminals of the material. The requirements of extracting maximum power are described as follows.

In a Thevenin's Equivalent Circuit, maximum power transferred of from the source $V_T$ to the load $Z_L$ occurs when the following three conditions are satisfied:
1. The output current $i_L$ is in phase with $V_T$.
2. The waveshape of $i_L$ is the same as that of $V_T$.
3. The value of $i_L = V_T/2R_T$.

The maximum load power $P_{L,max}$ is $$P_{L,max} = \frac{V_T^2}{4R_T} \quad (5)$$

In order to meet the above conditions, the load $Z_L$ should be in the form of $$Z_L = R_L + jX_L \quad (6)$$

where $R_L = R_T$ and $X_L = -X_T$.

$Z_L$ is thus the complex conjugate of $Z_T$. A physical interpretation is that $Z_L$ has to be capacitive if $Z_T$ is inductive. Conversely, $Z_L$ has to be inductive if $Z_T$ is capacitive.

Figure 2A:
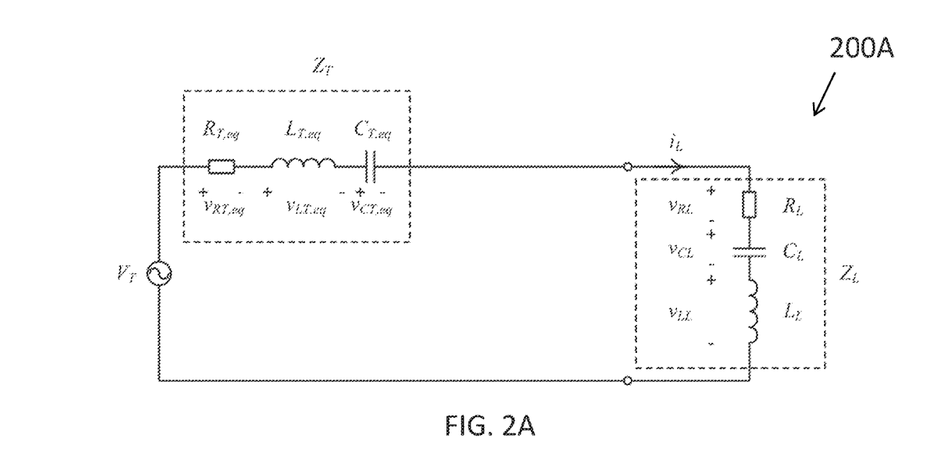
FIGS. 2A and 2B are schematic diagrams of a Thevenin's equivalent circuit and a Norton's equivalent circuit respectively representing another example electrical circuit.

With reference to FIG. 2A, there is shown a more complex form is that $Z_T$ is of high order, consisting of resistive, inductive, and capacitive components. $R_{T,eq}$ represents the equivalent resistance. $L_{T,eq}$ represents the equivalent inductance with its reactance being proportional to the operating frequency. $C_{T,eq}$ represents the equivalent capacitance with its reactance being inversely proportional to the operating frequency. The reactances of $L_{T,eq}$ and $C_{T,eq}$, $X_{LT,eq}$ and $X_{CT,eq}$ respectively, are $$X_{LT,eq} = 2\pi f L_{T,eq} \quad (7)$$

and $$X_{CT,eq} = \frac{1}{2\pi f C_{T,eq}} \quad (8)$$

In order to extract maximum power from the source, the principle of the load impedance being the complex conjugate of the source impedance still applies. Referring to FIG. 2A, a possible way is to use three series-connected components, $R_L$, $L_L$, and $C_L$, such that $$R_L = R_{T,eq} \quad (9)$$

$$X_{L,L} = -X_{CT,eq} \quad (10)$$

$$X_{L,C} = -X_{LT,eq} \quad (11)$$

where $X_{L,L}$ and $X_{L,C}$ are the reactances of $L_L$ and $C_L$, respectively.

Alternatively, in a Norton's Equivalent Circuit, maximum power transfer from the source $I_N$ to the load $Y_L$ occurs when the following three conditions are satisfied:
1. The output voltage $v_L$ is in phase with $I_N$.
2. The waveshape of $v_L$ is the same as that of $I_N$.
3. The value of $v_L = I_N/2G_N$.

The maximum load power $P_{L,max}$ is $$P_{L,max} = \frac{I_N^2}{4G_N} \quad (12)$$

In order to meet the above conditions, the load $Y_L$ should be in the form of $$Y_L = G_L + jB_L \quad (13)$$

where $G_L = G_N$ and $B_L = -B_N$.

Again, $Y_L$ is the complex conjugate of $Y_N$. A physical interpretation is that $Y_L$ has to be capacitive if $Y_N$ is inductive. Conversely, $Y_L$ should be inductive if $Y_N$ is capacitive.

Figure 2B:
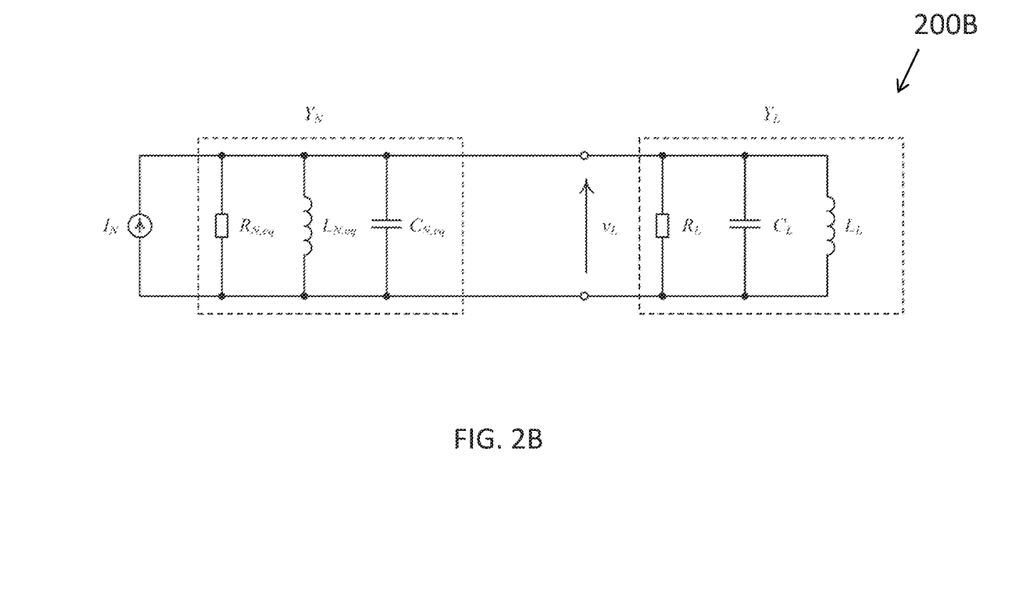

With reference to FIG. 2B, there is shown a more complex form is that $Y_N$ is of high order, consisting of parallel-connected resistive, inductive, and capacitive components. $R_{N,eq}$ represents the equivalent resistance. $L_{N,eq}$ represents the equivalent inductance with its susceptance being inversely proportional to the operating frequency. $C_{N,eq}$ represents the equivalent capacitance, having its susceptance being proportional to the operating frequency. The susceptances of $L_{N,eq}$ and $C_{N,eq}$, $B_{LN,eq}$ and $B_{CN,eq}$, respectively, are $$B_{LN,eq} = -\frac{1}{2\pi f L_{N,eq}} \quad (14)$$

and $$B_{CN,eq} = 2\pi f C_{N,eq} \quad (15)$$

Again, in order to extract maximum power from the source, the load admittance has to be the complex conjugate of the source admittance. As shown in FIG. 2(b), one of the possible ways is to use three parallel-connected components, $R_L$, $L_L$, and $C_L$, such that $$R_L = R_{N,eq} \quad (16)$$

$$B_{L,L} = -B_{CN,eq} \quad (17)$$

$$B_{L,C} = -B_{LN,eq} \quad (18)$$

where $B_{L,L}$ and $B_{L,C}$ are the susceptances of $L_L$ and $C_L$, respectively.

Preferably, to perform maximum power transfer, the load impedance should be the complex conjugate of the output impedance of the source in the Thevenin's equivalent circuit and the load admittance should be the complex conjugate of the output admittance of the source in the Norton's equivalent circuit. To meet the above requirement, the load reactances have to be frequency dependent. For example, the value of $X_L$ in FIG. 1A under maximum power transfer equals the complex conjugate of $X_T$. If $X_T$ is an inductor L and the operating frequency is f $$X_T = 2\pi f L \quad (19)$$

Based on (6), $$X_L = -X_T = -2\pi f L \quad (20)$$

Thus, $X_L$ should be capacitive. If a capacitor C is used for $X_L$, it can be shown that $$X_L = -\frac{1}{2\pi f C} \quad (21)$$

Based on (20) and (21), the required value of C is $$C = \frac{1}{(2\pi f)^2 L} \quad (22)$$

C is then a function of L and f. In other words, if the output frequency of the source is time-varying, maximum power transfer cannot always be assured with only a fixed capacitor. The capacitance has to vary with the operating frequency and the source inductance. Such requirement applies to examples of FIGS. 1B, 2A and 2B. Hence, such exemplification gives the following three considerations in extracting maximum power from the source.

Firstly, the load reactance has to vary with the operating frequency accordingly, so as to make it equal the complex conjugate of the source reactance. As illustrated in (22), the equivalent component value is actually frequency dependent. Hence, it is impossible to guarantee maximum power transfer over a wide operating frequency with fixed capacitors and/or inductors only.

Secondly, the source reactance and susceptance, that is, $X_T$ in FIG. 1A and $B_N$ in FIG. 1B, are sometimes not known a priori. This gives challenges to the designers to determine appropriate values of the load reactance $X_L$ in FIG. 1A and load admittance $B_L$ in FIG. 1B to counteract the effects of $X_T$ and $B_N$, respectively.

Thirdly, the source resistance and conductance, that is, $R_T$ in FIG. 1A and $G_N$ in FIG. 1B, are sometimes not known a priori. This gives challenges to the designers to determine appropriate values of the load resistance $R_L$ in FIG. 1A and load conductance $G_L$ in FIG. 1B to match $R_T$ and $G_N$, respectively.

Without wishing to be bound by theory, to ensure maximum power transfer, the load impedance or admittance has to be the complex conjugate of the source impedance or admittance, respectively. If the output impedance of the voltage source consists of series resistive, inductive, and capacitive properties, the load should also have series resistive, inductive, and capacitive properties in order to extract maximum power from the voltage source. More specifically, the load should have the resistance the same as the equivalent resistance of the output impedance. The load should have the reactance of its series inductance part the same as the reactance of the equivalent capacitance of the voltage source. The load should have the reactance of its series capacitance the same as the reactance of the equivalent inductance of the voltage source.

Similarly, if the output impedance of the current source exhibits parallel resistive, inductive, and capacitive properties, the load should also exhibit parallel resistive, inductive, and capacitive properties in order to extract maximum power from the current source. More specifically, the load should have the resistance part the same as the equivalent resistance of the output admittance of the current source. The load should have the susceptance of its inductance part the same as the susceptance of the equivalent capacitance of the current source. The load should have the susceptance of its capacitance part the same as the susceptance of the equivalent inductance of the current source.

Figure 3:
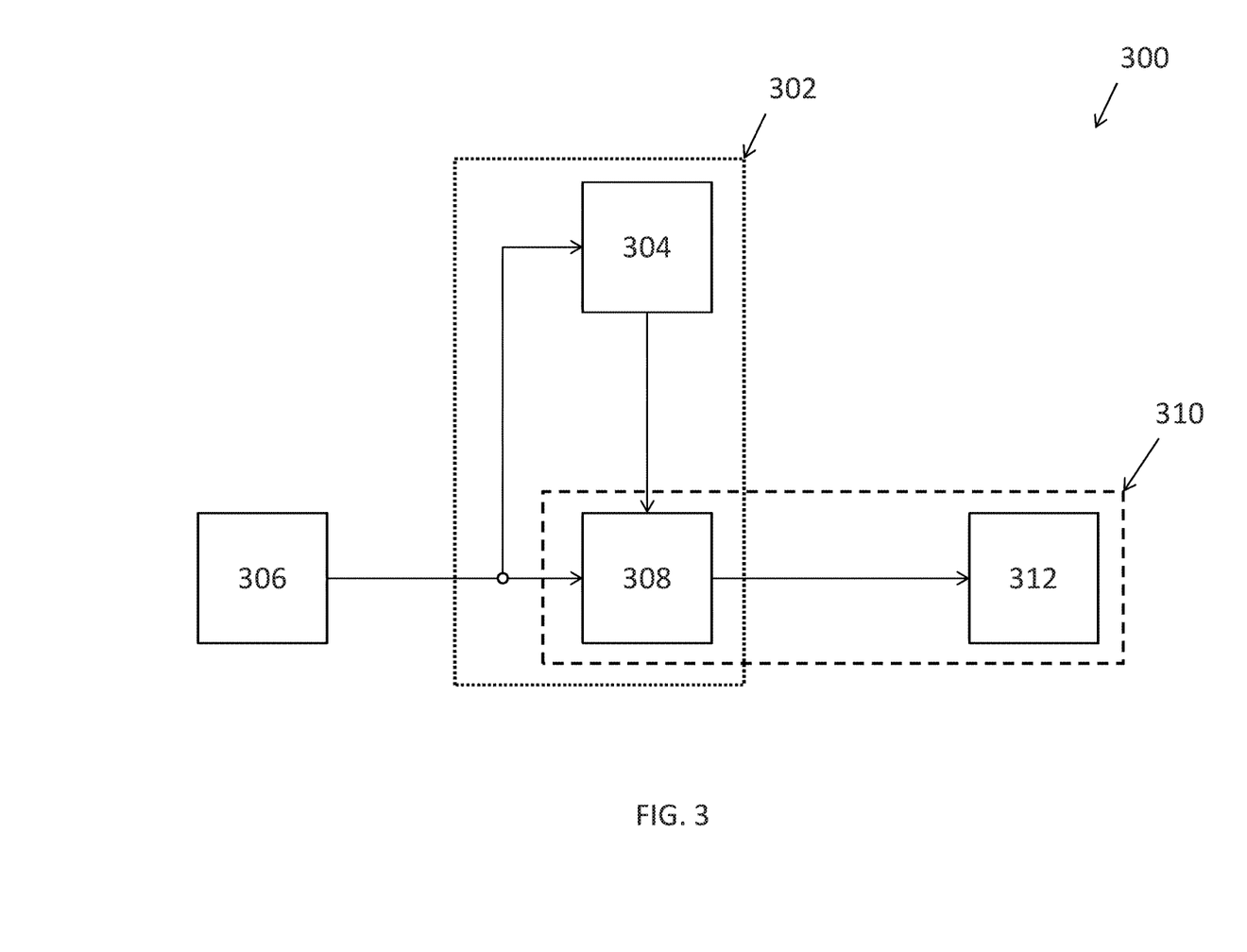
FIG. 3 is a block diagram of an electrical circuit with an electrical power regulating apparatus in accordance with one embodiment of the present invention.

With reference to FIG. 3, there is shown an example embodiment of an electrical power regulating apparatus 302 comprising: a controller 304 arranged detect an electrical source characteristic of an electrical power source 306; and a power converter 308 arranged to adjust an electrical load characteristic of an electrical loading stage 310 in connection with the electrical power source 306 based on the at least one electrical source characteristic being detected by the controller 304, such that the electrical power source 306 is arranged to deliver a maximum amount of electrical power to the electrical loading stage 310.

In this embodiment, the electrical power regulating apparatus 302 may be part of an electric circuit 300 comprising an electrical power source 306 and an electrical load 312. For example, the electrical power source 306 may be an AC or a DC power source, preferably including an electrical energy harvesting device such as a photovoltaic cell or module. When the electrical power source 306 generates an electrical power, the electrical power may be delivered to the electrical load 312 to power up the electrical load 312.

Preferably, the power converter 308 may be implemented as a portion of an electrical loading stage 310 which is connected to the electrical power source 306. In certain example operations, the electrical load 312 may consume a different amount of electrical power supplied by the electrical power source 306, and the power converter 308 may convert the electrical power delivered from the source to the power required by the electrical load.

For example, the electrical power source 306 may be a photovoltaic cell or module which may be designed to supply a maximum amount of electrical power so as to maximize the conversion efficiency of the electrical power source 306. The generated electrical power may be delivered to the entire electrical loading stage 310 including both the power converter 308 and the electrical load. Upon receiving the generated electrical power, the power converter 308 converts the received power to an electrical power required by the electrical load 312 such that the electrical load 312 may power up.

For example, the power converter 308 may include a bidirectional power converter 308 which is connected between the electrical load 312 and the electrical power source 306, such that the power converter 308 may selectively receive electrical power from the electrical power source 306 or deliver a supplementary electrical power to the electrical load 312. The operation of the bidirectional power converter 308 will be explained in different examples later in the disclosure.

The electrical source and the electrical loading stage 310 may operate with an electrical source characteristic and an electrical load characteristic, which include parameters or electrical properties such as resistance, inductance, capacitances, impedance and/or reactance. Preferably, the electrical power source 306 is arranged to deliver a maximum amount of power to the electrical loading stage 310 when the electrical load characteristic of the electrical loading stage 310 matches with the electrical source characteristic of the electrical power source 306 as explained earlier in this disclosure.

In one example embodiment, as the Thevenin's equivalent circuit and the Norton's equivalent circuit can be mutually converted with the conversion formulas given in (3) and (4), the electric circuit 300 may be modelled based on the Thevenin's equivalent circuit having a voltage source in series with an output impedance.

With reference also to FIG. 2A, the voltages across $R_{T,eq}$, $L_{T,eq}$, and $C_{T,eq}$, $v_{RT,eq}$, $v_{LT,eq}$, and $v_{CT,eq}$, respectively, are $$v_{RT,eq} = R_{T,eq}\, i_L \tag{23}$$

$$v_{LT,eq} = L_{T,eq}\frac{di_L}{dt} \tag{24}$$

$$v_{CT,eq} = C_{T,eq}\int i_L dt \tag{25}$$

Under maximum power transfer, the voltages across $R_L$, $C_L$, and $L_L$ are $$v_{RL} = v_{RT,eq} \quad (26)$$

$$v_{CL} = -v_{LT,eq} \quad (27)$$

$$v_{LL} = -v_{CT,eq} \quad (28)$$

where $v_{RL}$, $v_{CL}$, and $v_{LL}$ are the voltages across $R_L$, $C_L$, and $L_L$, respectively.

The physical interpretations of the above equations are that the voltage across $R_L$ is the same as $R_{T,eq}$, the voltages across $C_L$ and $L_{T,eq}$ are of opposite values, and the voltages across $L_L$ and $C_{T,eq}$ are of opposite values.

Figure 4:
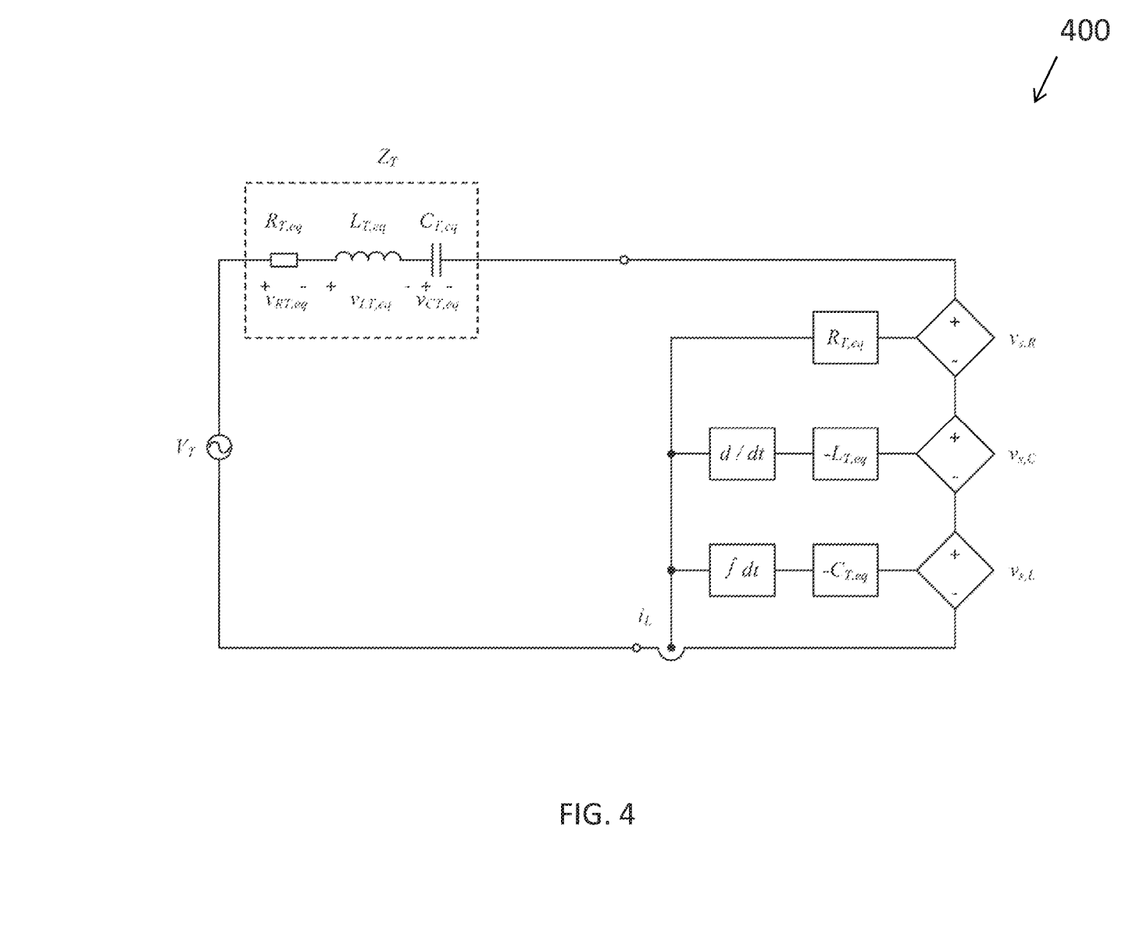
FIG. 4 is a schematic diagram of an electrical circuit operating with maximum power transfer using an active circuit.

With reference to FIG. 4 and based on (23), the maximum power transfer can also be assured if three series-connected voltage sources $v_{s,R}$, $v_{s,C}$, and $v_{s,L}$ are used. Their voltages are governed by the formulas of $$v_{s,R} = R_{T,eq} \, i_L \quad (29)$$

$$v_{s,C} = -L_{T,eq} \frac{di_L}{dt} \quad (30)$$

$$v_{s,L} = -C_{T,eq} \int i_L dt \quad (31)$$

which may be implemented using an active circuit.

Preferably, by sensing the output current $i_L$ only, it is possible to derive the required voltages generated by the sources. It should be noted that $v_{s,R}$ requires handling active power, while $v_{s,C}$ and $v_{s,L}$ require handling reactive power. The controller 304 may be arranged to detect these electrical source characteristic of the electrical source such that the power converter 308 may adjust the electrical load characteristic of the entire loading stage during operation. For example, the power converter 308 may be controlled by the controller 304 so as to adjust the electrical load characteristic.

Figure 5:
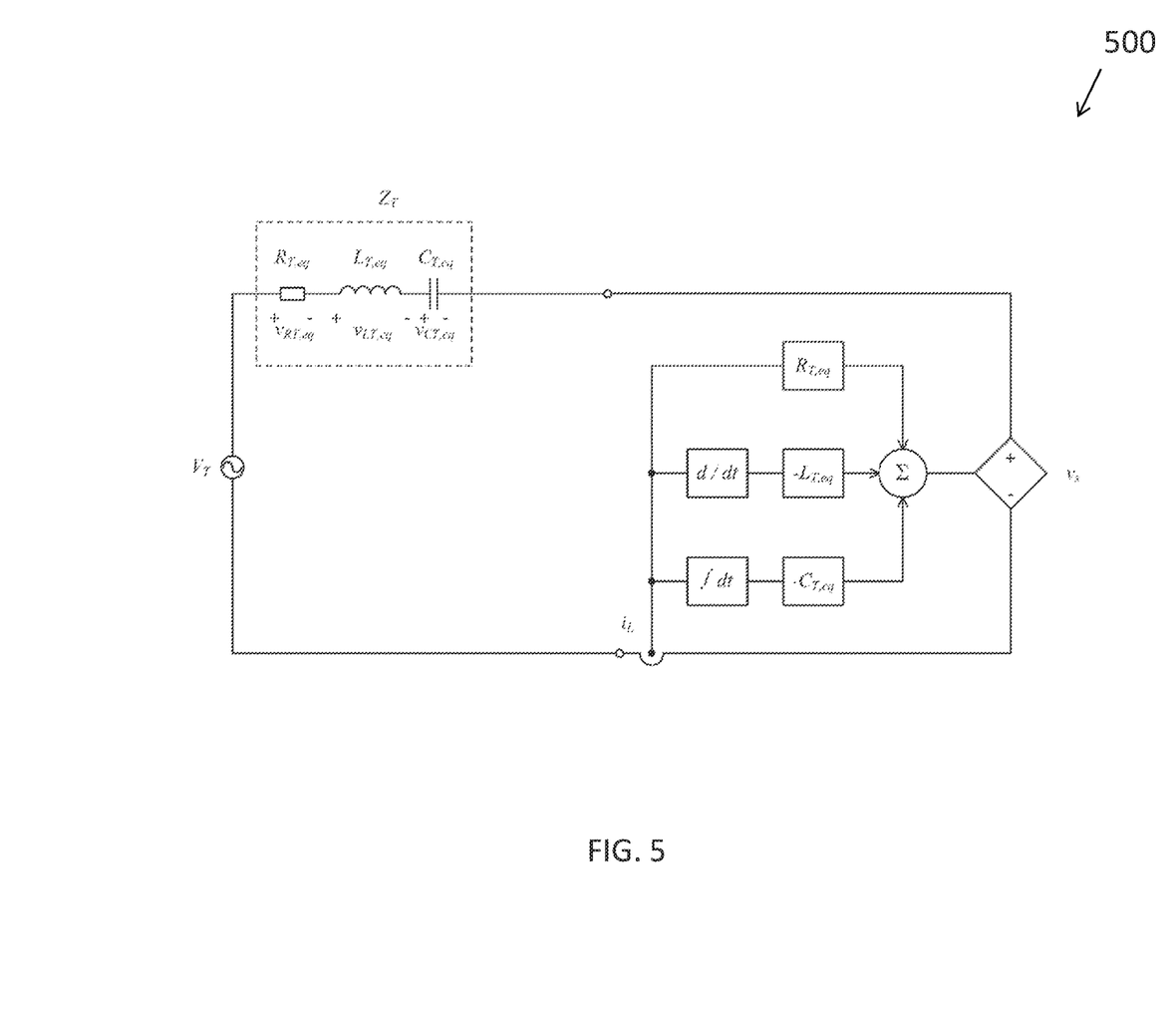
FIG. 5 is a schematic diagram of a modified implementation of the electrical circuit of FIG. 4.

In another example embodiment, referring to FIG. 5, the three voltage sources in the circuit as shown in FIG. 4 may be implemented as one single source $v_s$, such that $$v_s = v_{s,R} + v_{s,C} + v_{s,L} \quad (32)$$

Figure 6:
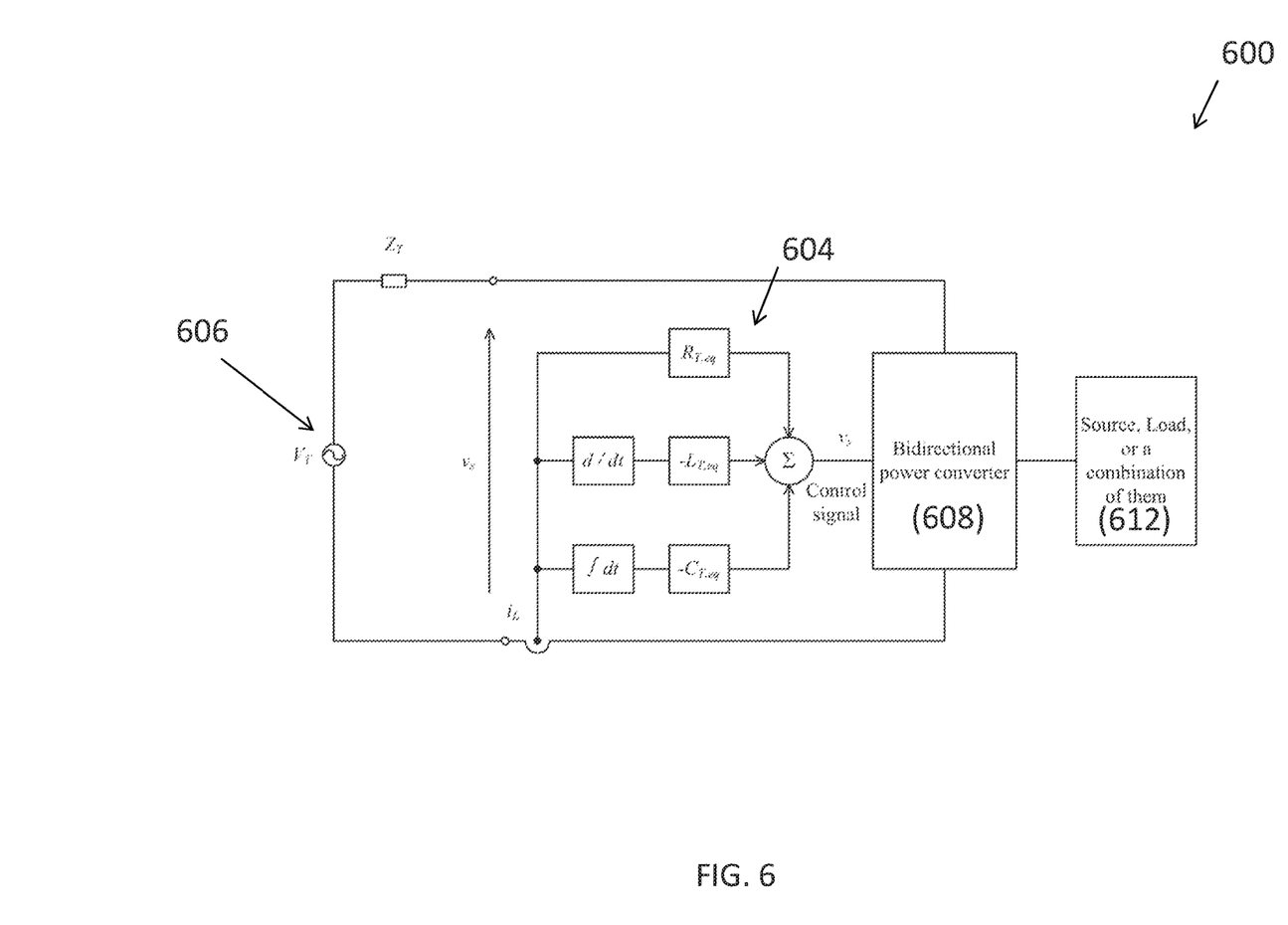
FIG. 6 is a schematic diagram of the electrical circuit of FIG. 5 implemented with a bidirectional power converter.

Preferably, the power converter 308 may include a bidirectional power converter, such that the voltage source can be realized by the bidirectional power converter. With reference to FIG. 6, the bidirectional power converter 608 includes one port being connected to the terminals of the Thevenin's equivalent circuit and generating required voltage $v_s$, as defined in (32), and another port of the power converter 608 is connected to a source, load, or a combination of them (612). In this example, the controller 604 is arranged to control the bidirectional power converter 608, thus the bidirectional power converter 608 may allow transferring active power from the source $V_T$ (606) to the load 612 and handling reactive power for counteracting the effects caused by the source reactance and/or an overall reactance of the electrical power circuit on reducing power transfer, i.e. in response to a variation in the amount of the electrical power delivered to the electrical loading stage by the electrical power source.

Figure 7:
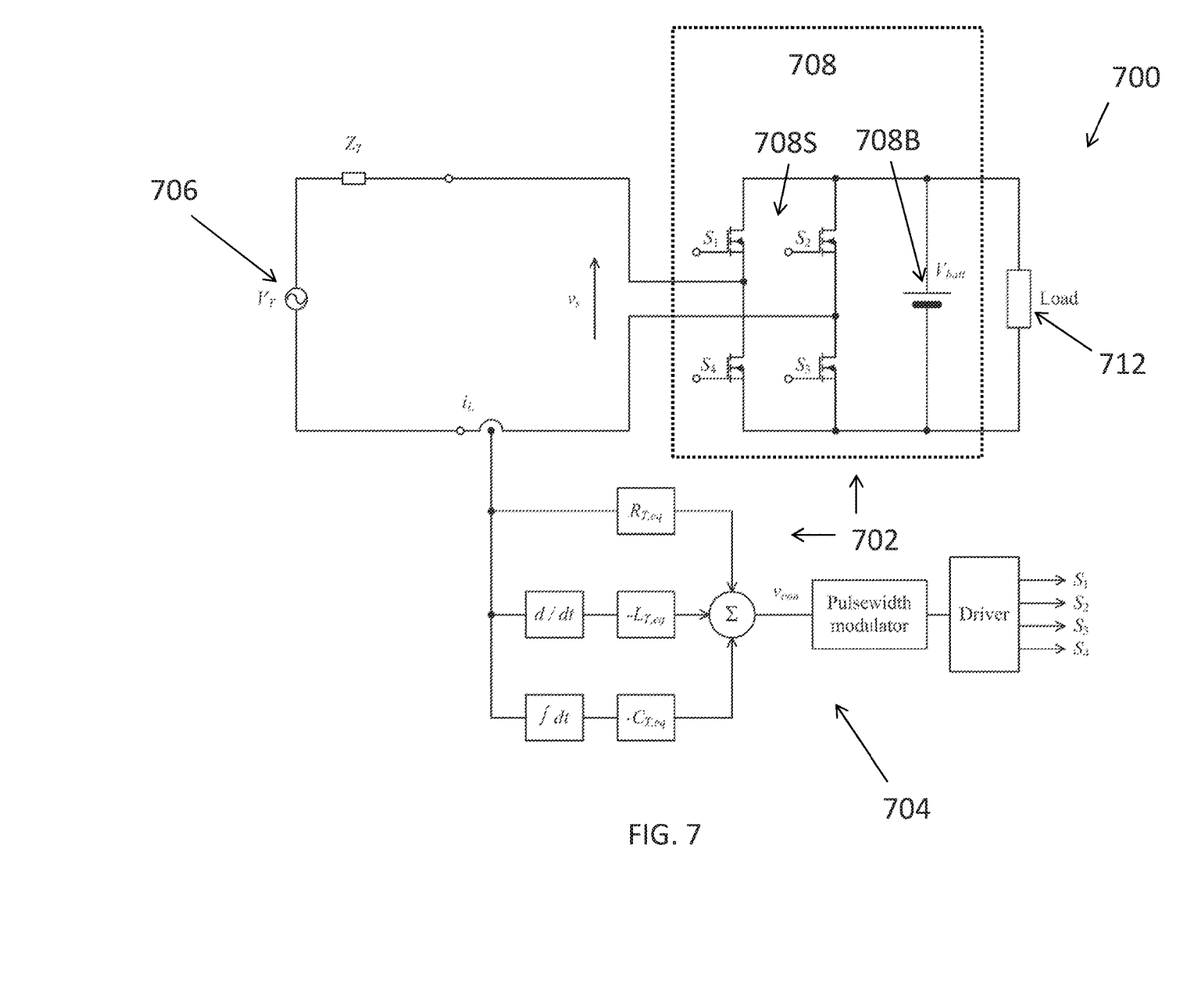
FIG. 7 is a schematic diagram of the electrical circuit of FIG. 6 with the bidirectional power converter implemented as a switching network and a battery.

With reference to FIG. 7, there is shown another example embodiment of the electrical power regulating apparatus 702 with an AC/DC converter included as the bidirectional power converter 708. In addition, the bidirectional power converter 708 further comprises an intermediate voltage source 708B such as a battery, preferably a rechargeable battery.

The AC/DC converter is connected to the terminals of the Thevenin's equivalent circuit, while the DC side of the converter is connected to a battery, such as a rechargeable battery. The load is connected across the rechargeable battery $V_{batt}$. The controller 704 is further arranged to control the switching network 708S of the bidirectional power converter 708 or the AC/DC network. The gate signals for the switches $S_1 \sim S_4$ in the switching network are generated by a pulsewidth modulator (PWM) which may be controllable by the controller 704 or implemented in the controller 704. The formula defined in (32) is used as a modulating signal for the modulator. As the AC/DC converter is bidirectional, the converter can deliver power to the battery 708B and load 712, and produce or absorb necessary reactive power to counteract the effect caused by the reactance in the circuit and/or the intrinsic reactance of the electrical power source 706.

Preferably, the intermediate voltage source 708B or the battery is arranged to receive a portion of electrical power from the electrical power source 706 and/or to deliver a supplementary electrical power to the electrical load 712, so as to counteract the effect caused by the reactance in the circuit and/or the intrinsic reactance of the electrical power source 706. The power extracted from $V_T$ (706) may be either used to charge the battery 708B or supply to the load 712. If the required load power is higher than the power extracted from $V_T$, the load 712 will be supplied by $V_T$ and the battery 708B. If the required load power is lower than the power extracted from $V_T$, the load 712 will be supplied by $V_T$. The extra power, i.e., the difference between the power extracted from $V_T$ and the load power, will be used to charge the battery 708B. In this configuration, the electrical power source 706 may operate to provide maximum power even when the load 712 requires a lower amount of electric power to operate. In one exemplary embodiment, the system may be used as an energy harvesting system with battery storage.

In some example embodiments, the values of $R_{T,eq}$, $L_{T,eq}$, and $C_{T,eq}$ are not known a priori. Thus, the parameters used in the generating $v_s$ should be determined by controller automatically. Preferably, these resistive, inductive and capacitive properties or parameters of the electrical power source may be determined based on a voltage value and a current value at the output terminal of the electrical power source obtained by the controller.

Figure 8:
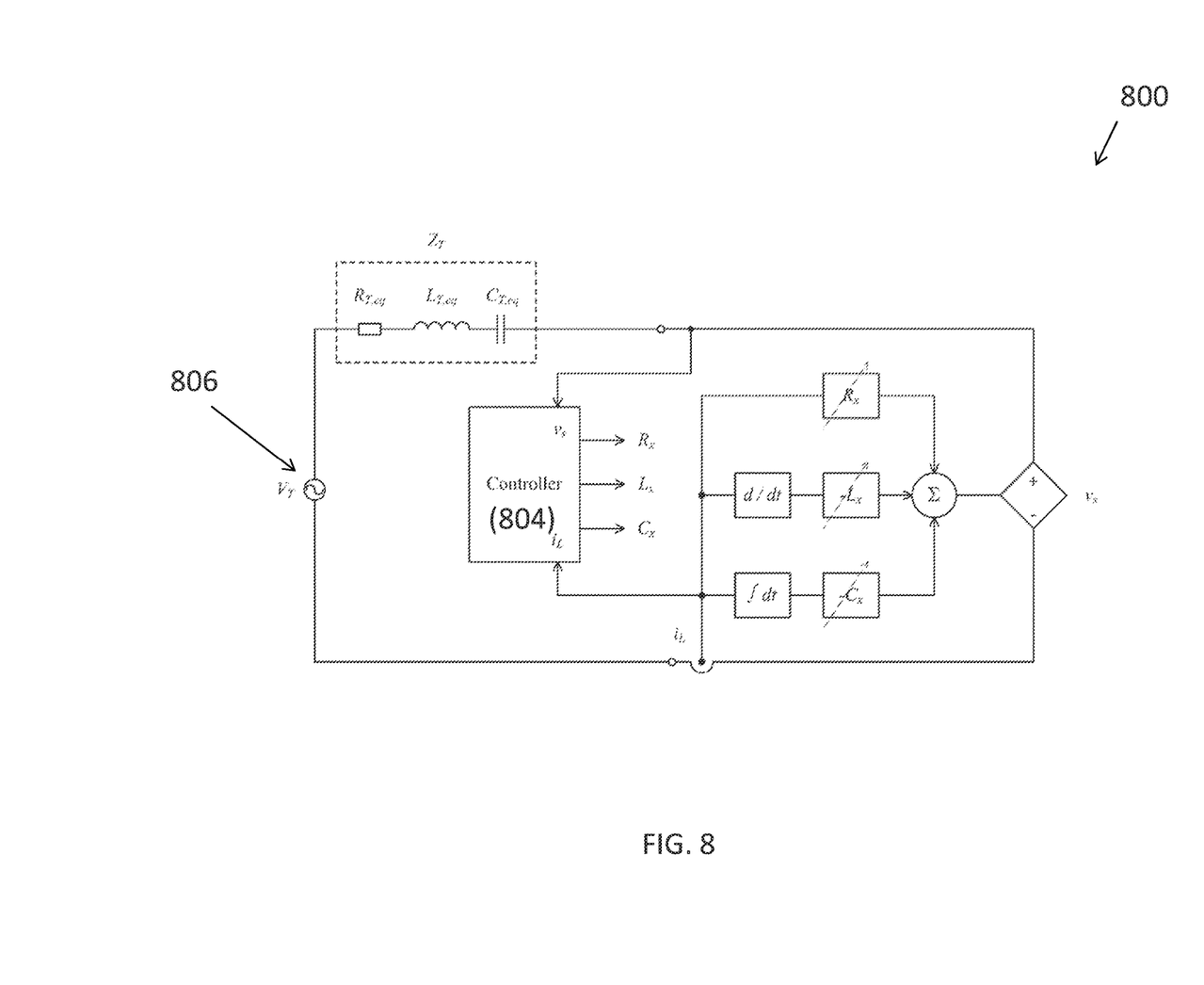
FIG. 8 is a schematic diagram of the electrical circuit of FIG. 5 in an alternative configuration.

With reference to FIG. 8, the controller 804 is further arrange to sense the waveforms of $v_s$ and $i_L$, so as to determine the values of $R_x$, $L_x$, and $C_x$. These parameters $R_x$, $L_x$, and $C_x$, may represent the values of $R_{T,eq}$, $L_{T,eq}$, and $C_{T,eq}$ respectively.

Figure 9:
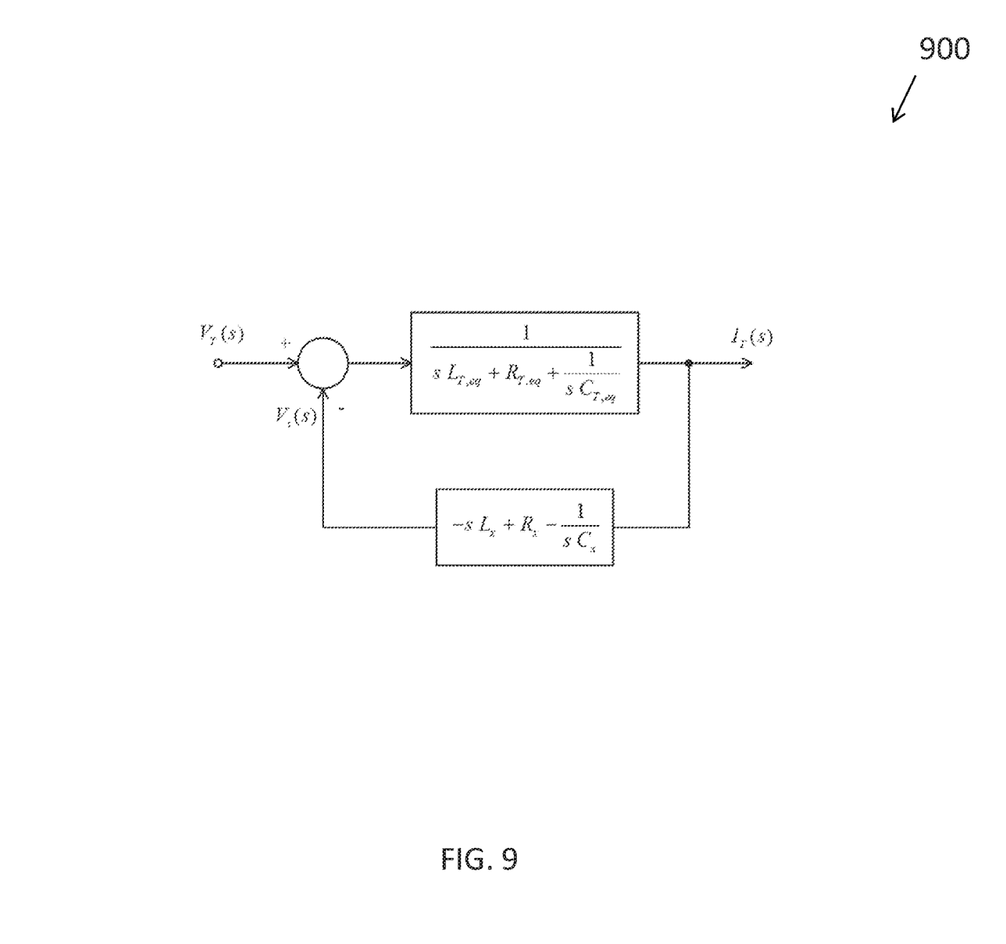
FIG. 9 is a block diagram of the electrical circuit of FIG. 8.

Preferably, the controller 804 is further arranged to determine the resistive, the inductive and the capacitive properties of the electrical power source 806 using a perturb-and-observer method. With reference to FIG. 9, there is shown a block diagram of an embodiment of an electrical circuit 900 implemented with the electrical power regulating apparatus in accordance with the present invention. The perturb-and-observe method involves representing the electrical power circuit 900 as the following representation:

$$I_T(s) = \frac{s}{s^2(L_{T,eq} - L_x) + s(R_{T,eq} + R_x) + \left(\frac{1}{C_{T,eq}} - \frac{1}{C_x}\right)} V_T(s) \quad (33)$$

Based on (33) and FIG. 9, the system is stable when $L_x \leq L_{T,eq}$ and $C_x \geq C_{T,eq}$. $i_T$ oscillates when $L_x > L_{T,eq}$ or $C_x < C_x < C_{T,eq}$. Preferably, the values of $L_x$, $C_x$, and $R_x$ may be determined and adjusted using perturb-and-observe method. The values of $L_x$ or $C_x$ may be firstly perturbed. Then, the waveform of iL is observed and determined if the values of $L_x$ or $C_x$ should further be increased or decreased. Similarly, the value of $R_x$ may be firstly perturbed, then the power extracted from the source $V_T$ may be obtained from the average value of the product of $v_s$ and iL. Based on the sign of the slope of the change of the power with respect to the change of the value of $R_x$, the value of $R_x$ will either be increased or decreased.

Figure 10:
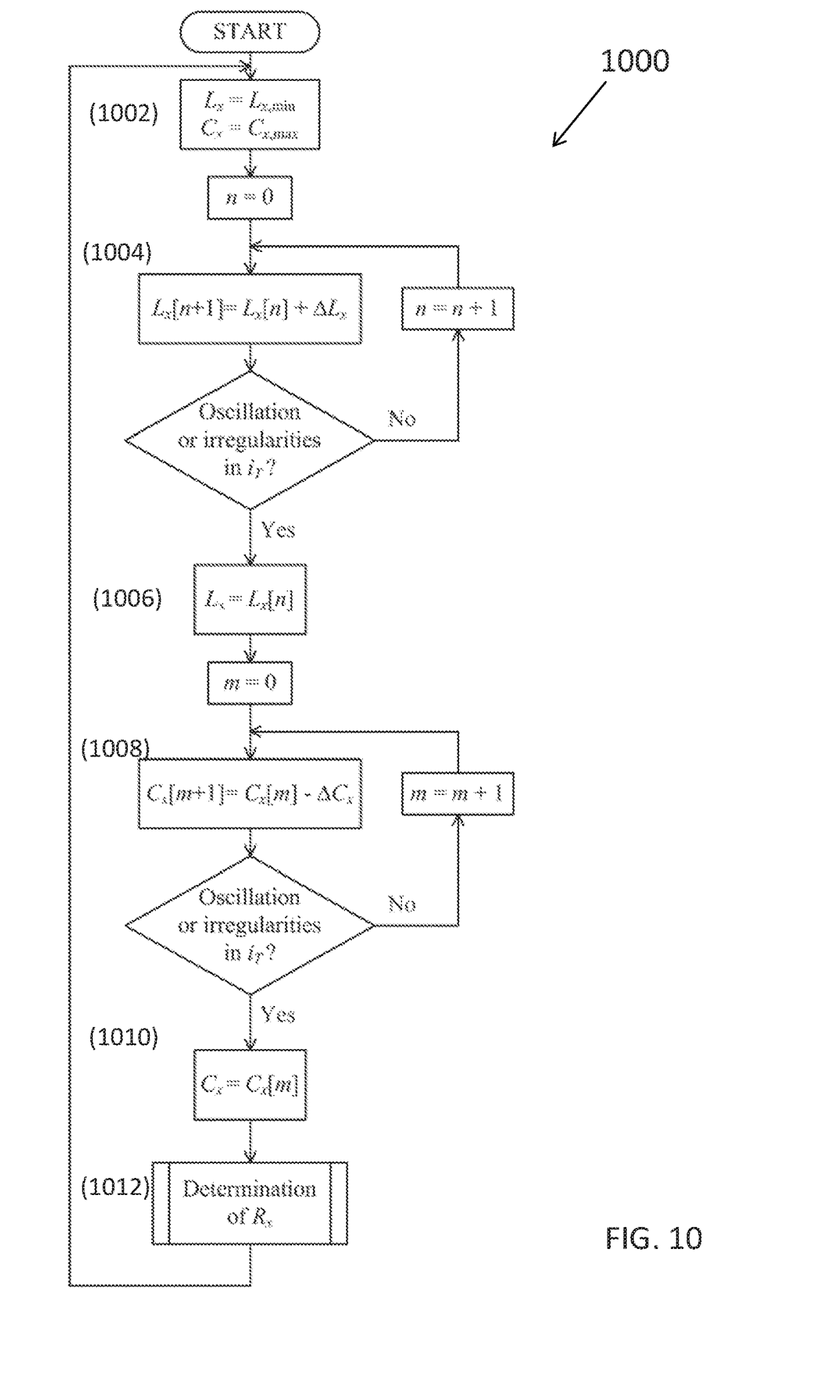
FIG. 10 is a flow diagram showing the operation of determining the values of $L_x$ and $C_x$.

With reference to FIG. 10, there is shown a simplified flowchart of the operation 1000 of the controller. The operation begins at step 1002, with the value of $L_x$ set at the smallest value $L_{x,min}$, i.e., $L_x[0]=L_{x,min}$, and the value of $C_x$ set at the largest value $C_{x,max}$, i.e., $C_x[0]=C_{x,max}$. The value of $L_x$ is determined by progressing the value in step of $\Delta L_x$. At the same time, the waveform of iL is sampled and observed. If no oscillations or waveform irregularities appear in iL, the value of $L_x$ will be increased at step 1004, that is, $$L_x[n+1]=L_x[n]+\Delta L_x \quad (34)$$

If oscillations or waveform irregularities appear in iL, at step 1006, the value of $L_x$ will be chosen to be the one in the previous step. That is, $$L_x=L_x[n] \quad (35)$$

After $L_x$ is determined, the value of $C_x$ is determined by using the same approach. The value of $C_x$ is determined by progressing the value in step of $\Delta C_x$. At the same time, the waveform of iL is sampled and observed. If no oscillations or waveform irregularities appear in iL, at step 1008, the value of $C_x$ will be decreased, that is, $$C_x[m+1]=C_x[m]-\Delta C_x \quad (36)$$

If oscillations or waveform irregularities appear in $i_T$, at step 1010, the value of $C_x$ will be chosen to be the one in the previous step. That is, $$C_x=C_x[m] \quad (37)$$

The operation continue at step 1012 in which the value of $R_x$ is determined.

Figure 11:
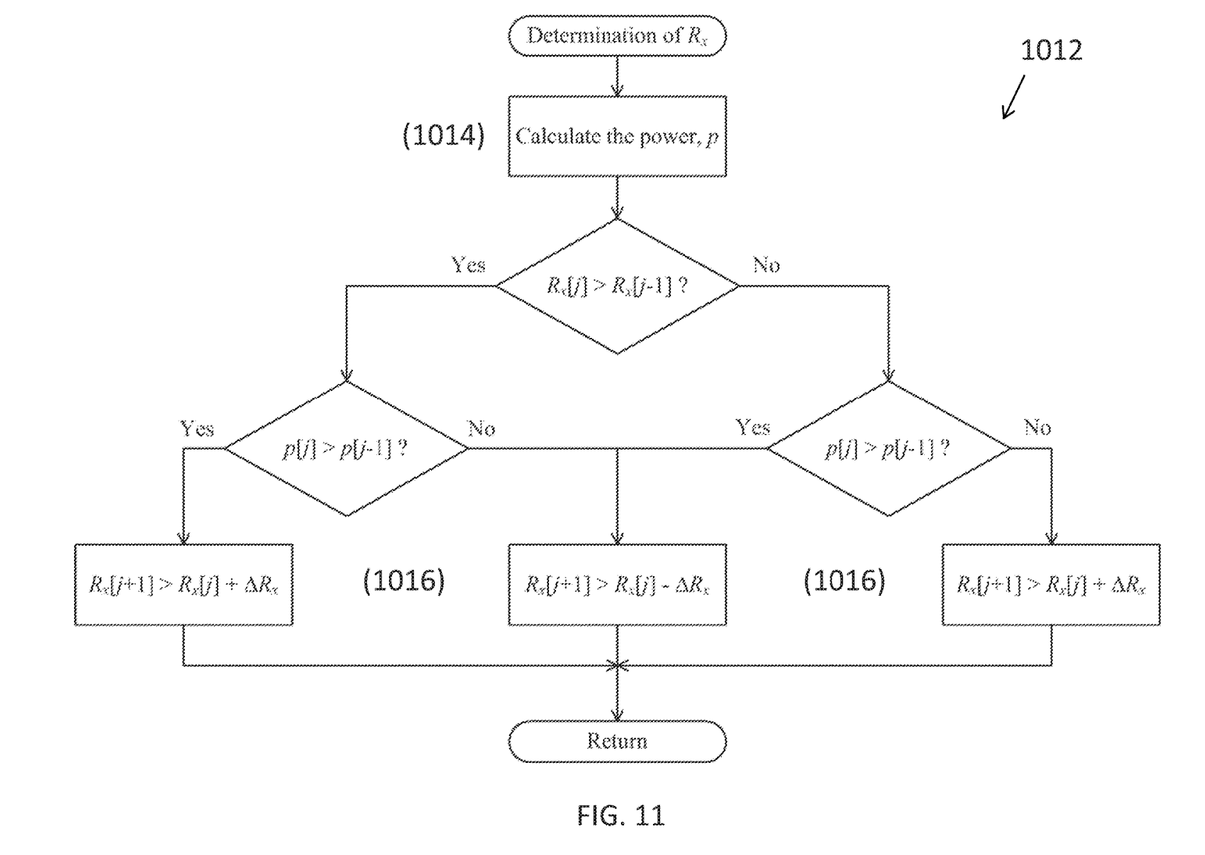
FIG. 11 is a flow diagram showing the operation of determination of $R_x$ in the operation of FIG. 10.

With reference to FIG. 11, the value of $R_x$ is determined by observing the power extracted from $V_T$ and progressing the value of $R_x$ in step of $\Delta R_x$. First, at step 1014, the power $p_L$ is obtained by averaging the product of the $v_s$ and iL over a period of time. At step 1016, if $p_L$ increases with the increase in $R_x$, $R_x$ will be further increased. That is, $$R_x[j+1]=R_x[j]+\Delta R_x \quad (38)$$

Otherwise, $$R_x[j+1]=R_x[j]-\Delta R_x \quad (39)$$

If $p_L$ increases with the decrease in $R_x$, $R_x$ will be further decreased. That is, $$R_x[j+1]=R_x[j]-\Delta R_x \quad (40)$$

Otherwise, $$R_x[j+1]=R_x[j]+\Delta R_x \quad (41)$$

The above procedure is repeated to determine the values of $L_x$, $C_x$, and $R_x$ over time. It should be noted that the principle is based on testing the system stability and maximum power point to determine the parameters. Variations of the procedure are allowed.

These embodiments may be advantageous in that an active circuit may be used to keep extracting maximum power from the source, independent of the operating frequency. It is unnecessary to know the intrinsic parameters about the output impedance of the source to locate the maximum power transfer point of the circuit. Moreover, it is unnecessary to know the values of the source resistance, inductance, and capacitance a priori.

Advantageously, the maximum power point is located by sensing the extrinsic variables only, without probing the intrinsic variables inside the circuit. Specifically, only the terminal voltage and current are required.

The method is based on using a voltage source with a power converter to connect to the output terminals of the equivalent circuit, and thus the power converter will generate necessary voltage waveforms to counteract the voltage drops of the source reactances and emulate a resistor equivalent to the source resistance to ensure maximum power transfer condition from a voltage source.

Advantageously, the electrical power regulating apparatus may extract true maximum power from electrical power source such as energy harvesters and may be applied to general electric circuit for controlling the power flow, such as power factor corrector.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for regulating an electrical power circuit, comprising the steps of:
  detecting an electrical source characteristic of an electrical power source; and
  adjusting, during an operation of the electrical power source, an electrical load characteristic of an electrical loading stage in connection with the electrical power source based on the at least one electrical source characteristic being detected by selectively generating necessary voltage waveforms thereby counteracting an effect caused by a source reactance of the electrical power source and/or a reactance of the electrical power circuit in response to a variation in the amount of the electrical power delivered to the electrical loading stage by the electrical power source, such that the electrical power source is arranged to deliver a maximum amount of electrical power to the electrical loading stage;
  wherein the electrical loading stage includes a bidirectional power converter and an electrical load, the bidirectional power converter is connected between the electrical load and the electrical power source; and
  wherein the bidirectional power converter is arranged to generate the necessary voltage waveforms.

2. The method in accordance with claim 1, wherein the electrical power source is arranged to deliver a maximum amount of power to the electrical loading stage when the electrical load characteristic matches with the electrical source characteristic.

3. The method in accordance with claim 1, wherein the step of counteracting the effect caused by the source reactance of the electrical power source and/or the reactance of the electrical power circuit includes delivering a portion of electrical power from the electrical power source to an intermediate voltage source of the bidirectional power converter and/or to delivering a supplementary electrical power from the intermediate voltage source to the electrical load.

4. The method in accordance with claim 3, wherein the intermediate voltage source includes a rechargeable battery.

5. The method in accordance with claim 3, wherein the step of adjusting an electrical load characteristic of an electrical loading stage further includes controlling a switching network of the bidirectional power converter so as to adjust the electrical power delivered to the intermediate voltage source and/or the supplementary electrical power delivered from the intermediate voltage source.

6. The method in accordance with claim 1, wherein the electrical source characteristic and the electrical load characteristic includes at least one of a resistive, an inductive and a capacitive properties of the electrical power source and the electrical loading stage respectively.

7. The method in accordance with claim 6, wherein the step of detecting an electrical source characteristic of the electrical power source comprises the step of using a perturb-and-observe method to determine the resistive, the inductive and the capacitive properties of the electrical power source.

8. The method in accordance with claim 7, wherein the step of using a perturb-and-observe method to determine the resistive, the inductive and the capacitive properties of the electrical power source comprises the step of representing the electrical power circuit as a representation of:

$$I_T(s) = \frac{s}{s^2(L_{T,eq} - L_x) + s(R_{T,eq} + R_x) + \left(\frac{1}{C_{T,eq}} - \frac{1}{C_x}\right)} V_T(s).$$

9. The method in accordance with claim 6, wherein the step of detecting an electrical source characteristic of the electrical power source includes obtaining a voltage value and a current value at an output terminal of the electrical power source so as to determine the resistive, the inductive and the capacitive properties of the electrical power source.

10. The method in accordance with claim 1, wherein the electrical power source includes an electrical energy harvesting device.

11. An electrical power regulating apparatus comprising:
a controller arranged detect an electrical source characteristic of an electrical power source; and
a power converter arranged to adjust an electrical load characteristic of an electrical loading stage in connection with the electrical power source based on the at least one electrical source characteristic being detected by the controller during an operation of the electrical power source; wherein the electrical loading stage includes the power converter and an electrical load, the power converter includes a bidirectional power converter connected between the electrical load and the electrical power source; and wherein the bidirectional power converter is arranged to selectively generate necessary voltage waveforms thereby counteracting an effect caused by a source reactance of the electrical power source and/or a reactance of the electrical power circuit in response to a variation in the amount of the electrical power delivered to the electrical loading stage by the electrical power source, such that the electrical power source is arranged to deliver a maximum amount of electrical power to the electrical loading stage.

12. The electrical power regulating apparatus in accordance with claim 11, wherein the electrical power source is arranged to deliver a maximum amount of power to the electrical loading stage when the electrical load characteristic matches with the electrical source characteristic.

13. The electrical power regulating apparatus in accordance with claim 11, wherein the bidirectional power converter comprises an intermediate voltage source arranged to receive a portion of electrical power from the electrical power source and/or to deliver a supplementary electrical power to the electrical load, so as to counteract the effect caused by the source reactance of the electrical power source and/or the reactance of the electrical power circuit.

14. The electrical power regulating apparatus in accordance with claim 13, wherein the intermediate voltage source includes a rechargeable battery.

15. The electrical power regulating apparatus in accordance with claim 13, wherein the controller is further arranged to control a switching network of the bidirectional power converter so as to counteract the effect caused by the source reactance of the electrical power source and/or the reactance of the electrical power circuit.

16. The electrical power regulating apparatus in accordance with claim 11, wherein the electrical source characteristic and the electrical load characteristic includes at least one of a resistive, an inductive and a capacitive properties of the electrical power source and the electrical loading stage respectively.

17. The electrical power regulating apparatus in accordance with claim 16, wherein the controller is further arranged to determine the resistive, the inductive and the capacitive properties of the electrical power source using a perturb-and-observe method.

18. The electrical power regulating apparatus in accordance with claim 16, wherein the controller is further arranged to obtain a voltage value and a current value at an output terminal of the electrical power source so as to determine the resistive, the inductive and the capacitive properties of the electrical power source.

19. The electrical power regulating apparatus in accordance with claim 11, wherein the electrical power source includes an electrical energy harvesting device.

20. The electrical circuit comprising an electrical power regulating apparatus in accordance with claim 11 and an electrical power source arranged to operate in a maximum power transfer condition.

* * * * *